United States Patent
Payne et al.

(12)

(10) Patent No.: US 8,930,774 B1
(45) Date of Patent: Jan. 6, 2015

(54) COMPUTER KIOSK AND RELATED SYSTEMS AND METHODS

(75) Inventors: John Payne, Orlando, FL (US); Christopher Beauchamp, Orlando, FL (US)

(73) Assignee: Monster Patents, LLC, Orlando, FL (US)

(*) Notice: Subject to any disclaimer, the term of this patent is extended or adjusted under 35 U.S.C. 154(b) by 224 days.

(21) Appl. No.: 13/603,583

(22) Filed: Sep. 5, 2012

Related U.S. Application Data

(63) Continuation-in-part of application No. 13/411,422, filed on Mar. 2, 2012, now Pat. No. 8,697,520.

(60) Provisional application No. 61/448,235, filed on Mar. 2, 2011.

(51) Int. Cl.
*G06F 11/00* (2006.01)

(52) U.S. Cl.
USPC .......................................................... 714/47.1

(58) Field of Classification Search
CPC ............ G06F 11/3409; G06F 11/3466; G06F 11/0793; G06F 11/0751; G06F 11/0488; G06F 11/0481; G06F 11/048; G06F 11/041; G06F 11/0482; G06F 11/016
USPC .......................................................... 714/47.1
See application file for complete search history.

(56) References Cited

U.S. PATENT DOCUMENTS

| | | | |
|---|---|---|---|
| 7,333,785 B1 * | 2/2008 | Lavelle et al. | 455/127.5 |
| 2003/0167203 A1 * | 9/2003 | Thorne et al. | 705/14 |
| 2004/0157639 A1 * | 8/2004 | Morris et al. | 455/550.1 |
| 2005/0137916 A1 * | 6/2005 | McElhannon | 705/5 |
| 2006/0112297 A1 * | 5/2006 | Davidson | 714/2 |
| 2007/0250920 A1 * | 10/2007 | Lindsay | 726/7 |
| 2007/0284442 A1 * | 12/2007 | Herskovitz | 235/383 |
| 2011/0022980 A1 * | 1/2011 | Segal et al. | 715/810 |
| 2012/0083921 A1 * | 4/2012 | Dronen et al. | 700/232 |

* cited by examiner

*Primary Examiner* — Yair Leibovich
(74) *Attorney, Agent, or Firm* — Allen, Dyer, Doppelt, Milbrath & Gilchrist

(57) ABSTRACT

Computer kiosks include input/output devices interactive user applications for local users. The operation of the interactive user applications, input/output devices and other kiosk hardware are monitored by software modules resident thereon, with status reporting to a remote computer system. The remote computer system allows users to monitor the operation of multiple, geographically disparate computer kiosks, and to remotely input commands thereto. Analytics relating to kiosk and application usage can also be captured and reported.

17 Claims, 3 Drawing Sheets

COMPUTER KIOSK AND RELATED SYSTEMS AND METHODS

CROSS-REFERENCE TO RELATED APPLICATIONS

This application is a continuation-in-part of U.S. Nonprovisional patent application Ser. No. 13/411,422, filed on Mar. 2, 2012, which claims the benefit of U.S. Provisional Application Ser. No. 61/448,235, filed on Mar. 2, 2011, the contents of which applications are herein incorporated by reference in their entirety.

FIELD OF THE INVENTION

The present invention relates to multi-user computer devices, and more particularly, to methods for monitoring and controlling such devices.

BACKGROUND OF THE INVENTION

As almost any user of a personal computer or personal electronic device will have experienced first-hand, computers will occasionally fail or "lock-up" for no apparent reason. While often annoying, such failures usually do not present a serious problem for the user, who can manually terminate a failed application, force a restart their computer, or some similar action which will ordinarily address the problem.

The situation can be somewhat different with failures occurring on multi-user computer devices, typically in fixed-locations—for example, research terminals in libraries, interactive informational displays at museums or entertainment venues, gaming terminals in bars or restaurants, etc. It is often not desirable to give users the necessary access or control over such devices to let them take the same corrective actions that they would with personal devices. However, since these devices are generally located on the premises of a staffed facility, problems will ordinarily be quickly reported by users or observed by maintenance personnel, allowing corrective actions to be taken by personnel with the appropriate access.

SUMMARY OF THE INVENTION

In view of the foregoing, it is an object of the present invention to provide computer kiosks and related systems and methods that allow reliable continued operation of computer kiosks by multiple, limited-access users in locations without frequent manual intervention.

According to an embodiment of the present invention, a computer kiosk includes a kiosk enclosure, an input device and an output device for local user interaction, a processor and machine-readable memory stored within the enclosure, and a communications device for communication with a remote computer system. Program instructions are stored on the machine-readable memory for the processor to execute various functional modules. The modules include an interactive local user application utilizing the input device and the output device, an applications monitor module for launching and monitoring the interactive local user application, a hardware monitor module for monitoring and controlling power to the input device and the output device and a communications module for receiving outputs from the applications monitor module, and the hardware monitor module, communicating the outputs to the remote computer, receiving commands from the remote computer system and routing the commands to the applications monitor module and the hardware monitor module.

According to another aspect of the present invention, a networked computer kiosk system includes a plurality of such kiosks along with the remote computer system. The remote computer system includes a remote computer system input device and a remote computer system output device, a remote computer system processor and machine-readable memory, and a remote computer system communications device for communicating with the plurality of computer kiosks. Program instructions are stored on the machine-readable memory for the remote computer system processor to execute a central control module for receiving the outputs communicated by the kiosk communications modules, displaying the outputs to a remote computer system user, receiving commands from the remote computer system user, and routing the commands to the kiosk communications modules.

These and other objects, aspects and advantages of the present invention will be better appreciated in view of the drawings and following detailed description of preferred embodiments.

DETAILED DESCRIPTION OF PREFERRED EMBODIMENTS

Figure 1:
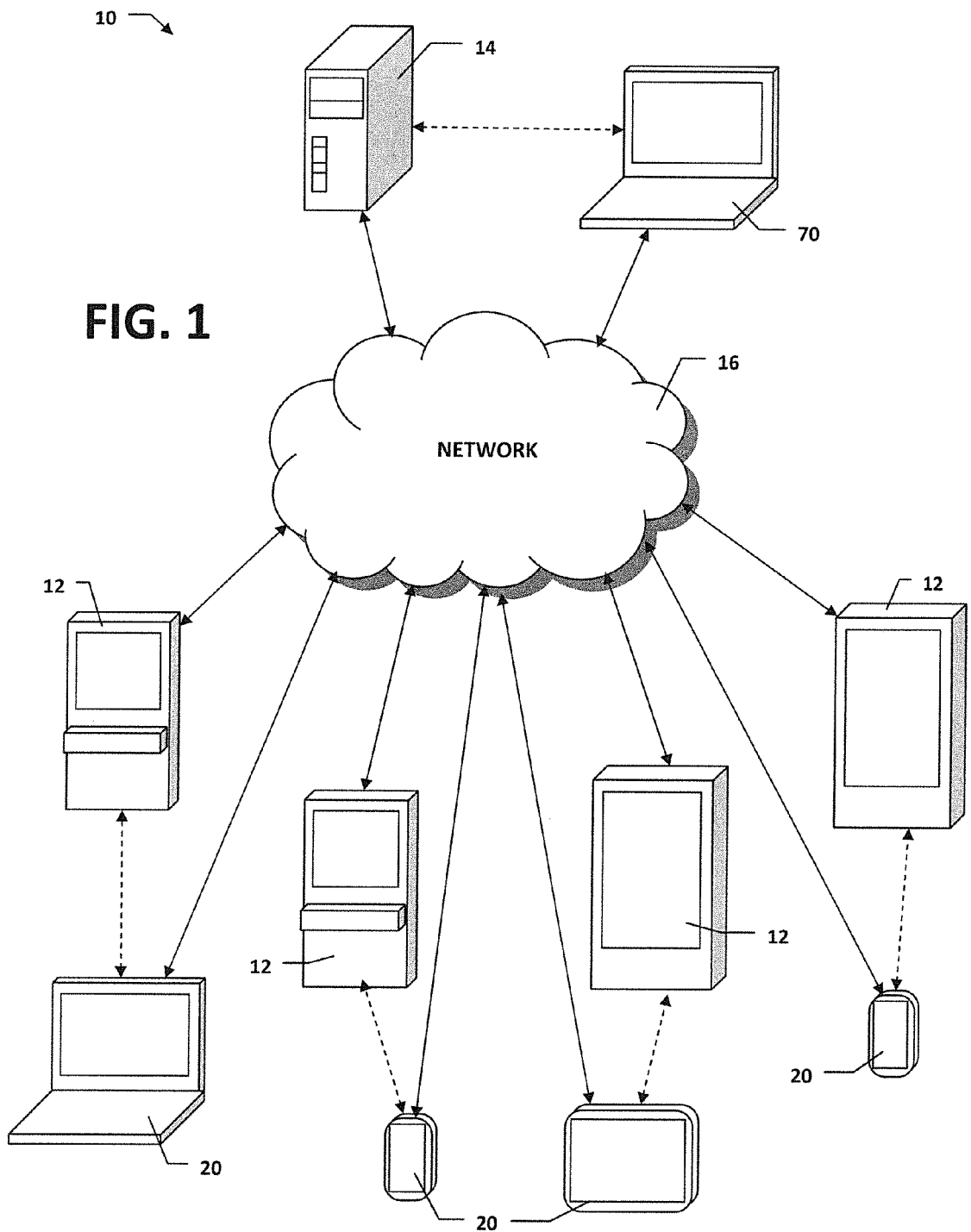
FIG. 1 is a schematic overview of a computer kiosk system 10, according to an embodiment of the present invention, including a plurality of computer kiosks and a remote computer system.

Referring to FIG. 1, according to an embodiment of the present invention, a networked computer kiosk system 10 includes a plurality of computer kiosks 12 in different physical locations and a remote computer system 14. The plurality of computer kiosks 12 communicate with the remote computer system 14 via one or more networks 16, such as cellular networks, the public switched telephone network (PSTN), the Internet, etc. Users of the kiosks 12 are able to interface with them using input/output devices incorporated therein or via personal electronic devices 20, such as smart phones, tablet computers, laptop computers, etc.

Figure 2:
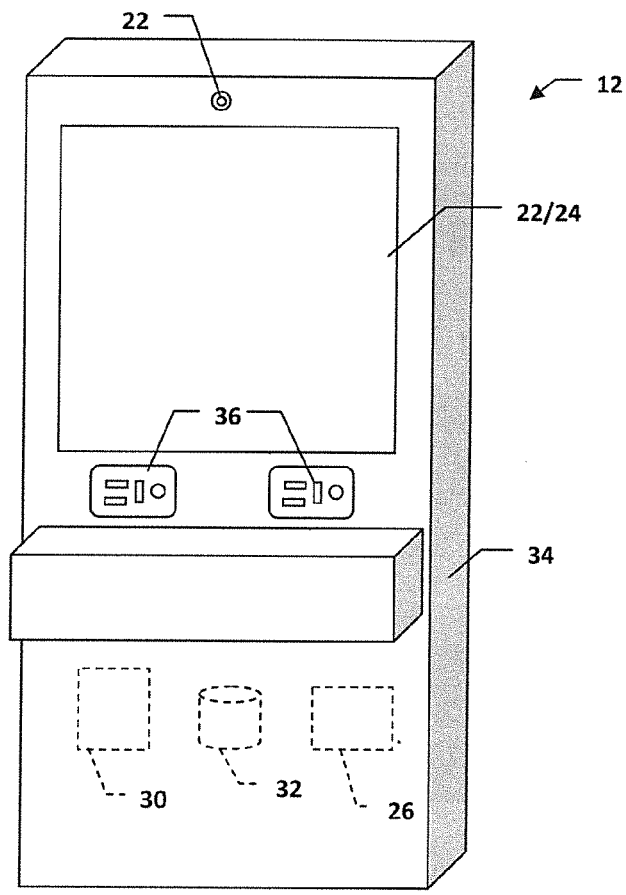
FIG. 2 is a schematic overview of an exemplary one of the computer kiosks of FIG. 1.

Referring to FIG. 2, while the computer kiosks 12 can take many different physical forms, each computer kiosk 12 preferably includes one or more input devices 22, output devices 24, communications devices 26, processors 30 and machine-readable memory 32 located on or within an enclosure 34. At least a portion of the computer kiosks 12 are in fixed locations, meaning that the kiosks 12 cannot be readily moved from their locations without the use of tools and/or disassembly. Additionally, "different physical locations" as used herein with reference to different kiosks 12 and the remote computer system 14 means that the units are not located on the premises of a single enterprise or individual.

Examples of possible input devices 22 include digital cameras, keyboards, trackballs, mice, and the like. Additionally, a credit card reader could be included as an input device 22. Examples of possible output devices 24 include monitors, speakers, printers and the like. Advantageously, a touchscreen monitor can be employed as both an input device 22 and an output device 24. The input/output devices 22, 24 are primarily for allowing local users (i.e., users in the immediate vicinity of the kiosks 12) to use interactive applications loaded thereon.

Examples of communications devices 26 include wireless modems, wired modems (such as DSL and/or cable modems) that allow connection of the computer kiosks 12 to the network(s) 16, via which the kiosks 12 can communicate with the remote computer system 14 and personal electronic devices 20. Alternately, or in addition to a modem, communications devices 26 can include a wireless or wired router for more direct communication with personal electronic devices 20 in the vicinity of the computer kiosks 12, and potentially serving as an Internet access point for such devices 20.

Communications devices 26 can also include short-distance radio communications devices for direct communications with properly equipped personal electronic devices 20 using Near Field Communications (NFC) or similar protocol. For example, the personal electronic device 20 is brought into close proximity with a designated spot of the kiosk 12, and data transmitted directly thereto. The data can advantageously include data related to information displayed on an output device 24, or otherwise related to a media campaign involving the kiosk 12, such as a uniform resource locator (URL) for a web page, a prize code, or media files. The data transfer via NFC or the like can also be used for payment authorization, in lieu of or in addition to a credit card reader.

Advantageously, one or more of the communications devices 26 can also serve as an input/output device 22, 24. For example, the kiosk 12 displays a phone number, website, or other locator, via which a user's personal electronic device 20 can establish a connection to the computer kiosk 12, or alternately, connects to the kiosk 12 through a wireless or wired network hosted by the kiosk 12, and then can use a keypad or other input device on the device 20 to interface with the kiosk 12 and data can likewise be communicated to the user through their device 20. For personal electronic devices 20, like smart phones and tablet computers, capable of downloading and executing software applications, an application including a special graphical user interface for an interactive kiosk software application can be downloaded and used.

With respect to the processor 30 and machine-readable memory 32, the present invention is not necessarily limited to any particular number or type of processors, or to any particular medium, amount or format for memory. The term "machine-readable memory" as used herein does not refer to memory in the abstract (e.g., as mere patterns of energy) but also to the physical storage medium. A computer kiosk 12 can include multiple processors and functions described herein as handled by "a processor" or "the processor" could be divided or shared between such multiple processors.

The enclosure 34 generically describes the physical structure supporting the various components of the computer kiosk 12. It is not necessarily required that the enclosure 34 be a unitary structure or fully enclose any or all of the various components. Kiosks 12 can be located virtually anywhere, with some examples of locations including airports, bus stations/stops, train stations, convention centers, sports arenas and the like. To increase their interest/utility to users, the kiosks 12 can also include charging ports 36 for the personal electronic devices 20.

Figure 3:
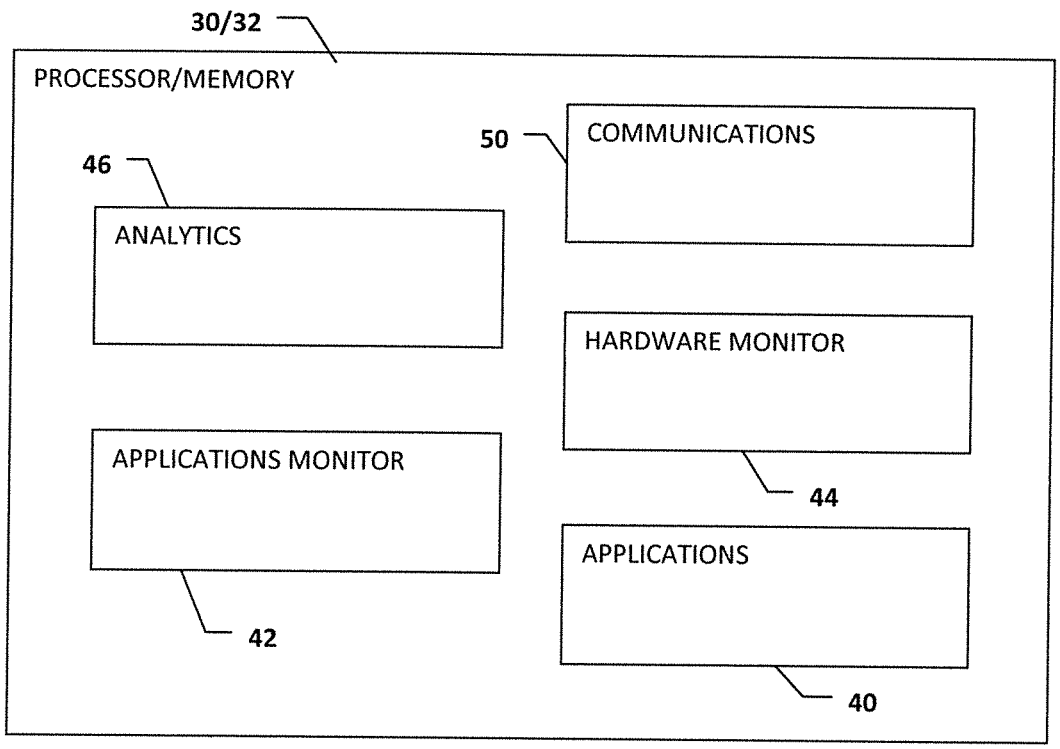
FIG. 3 is an operational schematic of software modules executed by the computer kiosks of FIG. 1.

Referring to FIG. 3, program instructions are stored in the machine-readable memory 32 allowing the processor 30 to execute various functions using the kiosk 12 components. Advantageously, the processor 30 and machine-readable memory 32 are configured to execute interactive local user applications 40, an applications monitor module 42, a hardware monitor module 44, an analytics module 46 and a communications module 50.

The interactive user applications 40 can include any applications that would be relevant or interesting to users in the vicinity of the kiosk. One example is an "augmented reality" application that uses a camera to display a video feed of the user and their environment. Applying algorithms to the video feed to recognize facial features of the user and the surrounding environment, the augmented reality application can generate a dynamic, three-dimensional object on or around the user—for example, to place masks or other articles of clothing on the user's face or head, and then move the object as the user moves. A still photo or video of the augmented reality can be sent to the user's personal electronic device 20 to or another destination specified by the user. Alternatively, the user can select alterations to be made to the photo or video, which can then be sent to the user or others. The application can insert advertising content into the photos or videos before sending them.

Applications in which a local user is allowed to purchase specific items can interface with a credit card reader input device 22, or other payment authorization mechanism, with additional order details being confirmed via a touch screen display or other input device 22. A receipt can be supplied via a printer output device 24, and/or an electronic receipt can be transmitted to the purchasing user's personal electronic device.

The applications monitor module 42 monitors and controls the running of the interactive user applications 40. The applications monitor module 42 can preferably be used to set application parameters, such as initial launch delays for the applications 40, command line flags for the applications, and the like. Once a given application 40 is launched, the applicants monitor module 42 will monitor its operation and can automatically relaunch the application 40 if it crashes. Crash detection is advantageously achieved by a programmed "heartbeat" in each application that sends regular, periodic communications to the monitor module 42, cessation of the heartbeat being indicative of a crash.

The hardware monitor module 44 monitors and controls the hardware components of the kiosk 12—for instance, the input devices 22, output devices 24, and/or communications devices 26. The hardware monitor module 44 can integrate manufacturer's drivers and/or control codes for the various hardware components, serving as an intermediary interface between commands received from the remote computer system 14. Thus, even though different kiosks 12 might have different makes and models of hardware components, the remote computer system 14 and users thereof need can control and monitor all such components using a single interface that is largely standardized for all kiosks in the system 10.

The hardware monitor module 44 can be set to execute hardware commands according to a predetermined schedule. For example, the hardware monitor module 44 can automatically power off all display screens at 2:00 A.M. each day and automatically turn them back on at 6:00 A.M. Where a printer or the like is used with consumable elements (e.g., ink, paper, etc.), the hardware monitor module 44 can automatically generate alerts than a consumable component is nearing exhaustion.

The analytics module 46 tracks and reports usage of the interactive user applications 40. Trigger points are built into each application 40 where user interaction with the application is to be tracked. For example, a user selection of a given application, or of a specific menu option within a given application can be triggers, which interactions are then logged by the analytics module 46. At predetermined intervals, the logged interactions can be communicated to the remote computer system 14 and/or communicated upon receipt of a specific query.

The analytics module 46 can also indicate problems with the applications 40 as a complement/back-up to the applications monitor module 42. For example, a lack of triggers indicating user interactions within a predetermined time after a given application 40 is launched can be indicative of a problem with the application 40, that might otherwise be undetected. The analytics module 46 generates a warning if there are no or abnormally few interactions logged.

The communications module 50 collects information from the applications monitor module 42, hardware monitor module 44 and analytics module 46 and forwards such information to the remote computer system 14, either at predetermined intervals and/or occasions or upon request. For example, the communications module 50 can be directed to provide routine status reports hourly, daily or the like, and to immediately provide notice of potential application and/or hardware problems. Routine information reported can include CPU load, memory usage, collected analytics data. A response to a request for current status can include information such as a time since last response, currently running application, a current display screenshot, and current hardware status.

The communications module 50 also receives commands from the remote computer system 14 and utilizes the appropriate modules 42, 44, 46 to execute the commands. For example, the communications module 50 can allow remote direction to execute component or system restarts, re-launch content or upload files.

Figure 4:
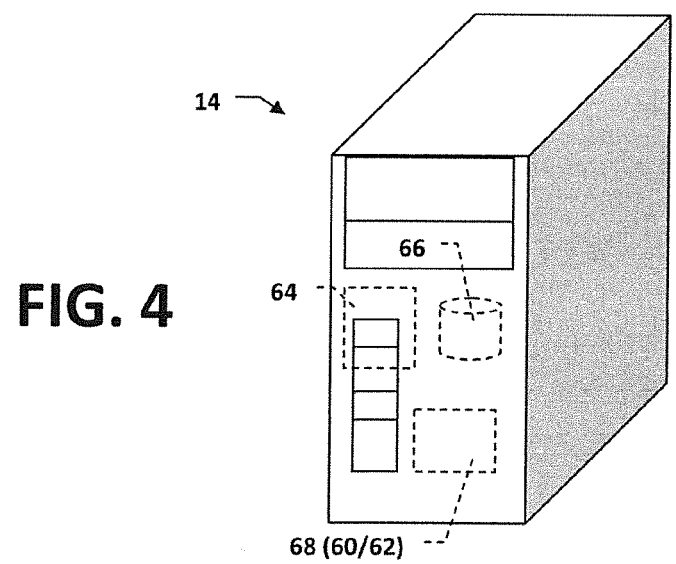
FIG. 4 is a schematic overview of the remote computer system of FIG. 1.

Referring to FIG. 4, the remote computer system 14 includes a remote computer system input device 60 and output device 62, and a remote computer system processor 64 and machine readable memory 66. Advantageously, the input and output devices 60/62 include a network communications device 68, which in addition to transmitting/receiving communications to/from the kiosks 12, transmits and receives communications from remote computer system 14 users on other computers; for instance, through a web-based interface. However, the remote computer system 14 could be accessed directly via its own keyboard, mouse, etc., and generate local outputs via an attached display, printer and/or the like. As with the kiosks 12, the remote computer system 14 is not necessarily limited to any particular number or type of processors, or to any particular medium, amount or format for memory. Also, multiple remote computer system 14 functions could be distributed across a number of physically separated, but networked, machines.

Figure 5:
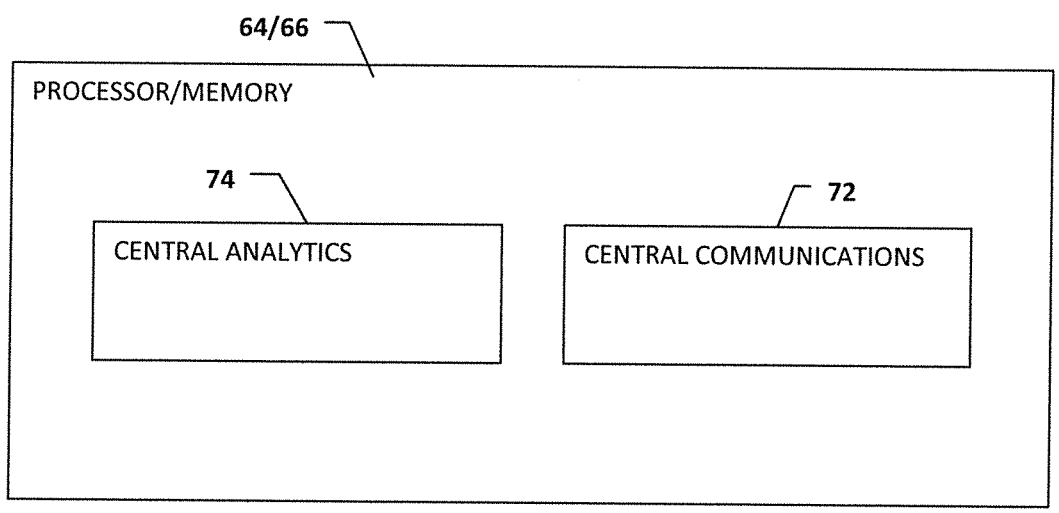
FIG. 5 is an operational schematic of software modules executed by the remote computer system of FIG. 1.

Referring to FIG. 5, the remote computer system processor 64 and memory 66 are configured to execute a central communications module 72 and a central analytics module 74. The central communications module 72 collects the above-described information from all kiosks 12 in the system 10, and allows users to query the kiosks 12 for additional information, and direct performance of one-time and/or recurring actions. The central communications module 72 preferably displays the information and accepts commands via a graphical web-based user interface. The central communications module 72 can also automatically communicate alerts (e.g., through email, text or other medium) to users when a problem requiring immediate attention arises.

The central analytics module 74 receives the analytics date from the analytics modules 46 of the kiosks 12. The central analytics module 74 compiles this information and displays it to authorized users, preferably also via a graphical, web-based user interface. Via the interface, customizable reports are displayable showing, for instance, comparisons between the usage of the same application 40 on kiosks 12 in different locations, comparisons between different applications 40 system-wide, or at individual kiosks 12, allowing evaluation of the success of different contents, marketing campaigns, etc.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A computer kiosk comprising:
a kiosk enclosure;
an input device and an output device for local user interaction;
a processor and machine-readable memory stored within the enclosure; and
a communications device for communication with a remote computer system; wherein program instructions are stored on the machine-readable memory for the processor to execute:
an interactive local user application utilizing the input device and the output device;
an applications monitor module for launching and monitoring the interactive local user application;
a hardware monitor module for monitoring and controlling power to the input device and the output device; and
a communications module for receiving outputs from the applications monitor module, and the hardware monitor module, communicating the outputs to the remote computer, receiving commands from the remote computer system and routing the commands to the applications monitor module and the hardware monitor module;
wherein the communications module receives commands relating to the operation of the input device and the output device from the remote computer system, the hardware monitor module receiving the commands from the communications module and executing the commands; and wherein the commands include commands to power off the input device or the output device on a predetermined schedule.

2. The computer kiosk of claim 1, further comprising a charging port for a personal electronic device.

3. The computer kiosk of claim 1, wherein the input and output devices each comprise a plurality of devices.

4. The computer kiosk of claim 1, wherein the output device includes a display screen and the input device includes a touch sensitive component of the display screen.

5. The computer kiosk of claim 1, wherein the input device includes a camera.

6. The computer kiosk of claim 1, wherein the interactive local user application includes a recurring status signal received by the applications monitor module, the applications monitor module automatically stopping and re-launching the interactive local user application based on a failure of the recurring status signal.

7. The computer kiosk of claim 6, wherein the applications monitor module communicates the failure of the recurring status signal to the communications module, the communications module communicating the failure of the recurring status signal to the remote computer system.

8. The computer kiosk of claim 1, wherein program instructions are stored on the machine-readable memory for the processor to further execute an analytics module for tracking usage statistics of the interactive local user application, the communications module communicating the usage statistics to the remote computer system.

9. The computer kiosk of claim 8, wherein the analytics module includes a trigger in the interactive local user application to log a predetermined user interaction.

10. The computer kiosk of claim 9, wherein the communications module communicates a failure to log the predetermined user interaction within a predetermined period of time to the remote computer system.

11. A computer kiosk comprising:
a kiosk enclosure;
an input device and an output device for local user interaction;
a processor and machine-readable memory stored within the enclosure; and
a communications device for communication with a remote computer system; and
a charging port for a personal electronic device;
wherein program instructions are stored on the machine-readable memory for the processor to execute:
an interactive local user application utilizing the input device and the output device;
an applications monitor module for launching and monitoring the interactive local user application;
a hardware monitor module for monitoring and controlling power to the input device and the output device; and
a communications module for receiving outputs from the applications monitor module, and the hardware monitor module, communicating the outputs to the remote computer, receiving commands from the remote computer system and routing the commands to the applications monitor module and the hardware monitor module;
wherein the hardware monitor module also monitors and controls power to the charging port.

12. A computer kiosk comprising:
a kiosk enclosure;
an input device and an output device for local user interaction;
a processor and machine-readable memory stored within the enclosure; and
a communications device for communication with a remote computer system;
wherein program instructions are stored on the machine-readable memory for the processor to execute:
an interactive local user application utilizing the input device and the Output device;
an applications monitor module for launching and monitoring the interactive local user application;
a hardware monitor module for monitoring and controlling power to the input device and the output device; and
a communications module for receiving outputs from the applications monitor module, and the hardware monitor module, communicating the outputs to the remote computer, receiving commands from the remote computer system and routing the commands to the applications monitor module and the hardware monitor module;
wherein at least one of the input and output devices includes the communications device, the communications device establishing a communications link with a personal electronic device in the vicinity of the kiosk enclosure used by the interactive local user application.

13. The computer kiosk of claim 12, wherein the communications link is routed to the personal electronic device through a cellular network.

14. The computer kiosk of claim 13, wherein a graphical user interface for the interactive local user application is transmitted to the personal electronic device via the communications link.

15. A networked computer kiosk system comprising:
a plurality of computer kiosks in different physical locations, each of the plurality of computer kiosks including:
a kiosk enclosure;
a kiosk input device and a kiosk output device for local user interaction;
a kiosk processor and machine-readable memory stored within the enclosure; and
a kiosk communications device for communication with a remote computer system;
wherein program instructions are stored on the machine-readable memory for the kiosk processor to execute:
an interactive local user application utilizing the kiosk input device and the kiosk output device;
an applications monitor module for launching and monitoring the interactive local user application;
a hardware monitor module for monitoring and controlling power to the kiosk input device and the kiosk output device; and
a kiosk communications module for receiving outputs from the applications monitor module, and the hardware monitor module, communicating the outputs to the remote computer, receiving commands from the remote computer system and routing the commands to the applications monitor module and the hardware monitor module; and
the remote computer system at a different physical location than the plurality of computer kiosks, the remote computer system including:
a remote computer system input device and a remote computer system output device;
a remote computer system processor and machine-readable memory; and
a remote computer system communications device for communicating with the plurality of computer kiosks;
wherein program instructions are stored on the machine-readable memory for the remote computer system processor to execute:
a central communications module for receiving the outputs communicated by the kiosk communications modules, displaying the outputs to a remote computer system user, receiving commands from the remote computer system user, and routing the commands to the kiosk communications modules;
wherein, in each computer kiosk, program instructions are stored on the machine-readable memory for the kiosk processor to further execute a kiosk analytics module for tracking usage statistics of the interactive local user application, the communications module communicating the usage statistics to the remote computer system; and
wherein program instructions are stored on the machine-readable memory for the remote computer system processor to further execute a central analytics module, the analytics module compiling the usage statistics from the plurality of computer kiosks, and generating reports on the compiled usage statistics.

16. The networked computer kiosk system of claim 15, wherein the central analytics module reports displays the reports via graphical web interface.

17. The networked computer kiosk system of claim 15, wherein the reports include comparisons of usage statistics for different interactive local user applications and for different computer kiosks.

* * * * *